March 2, 1954
H. W. WALDEN
2,670,666
CAMERA AND LAMP SUPPORT, INCLUDING CAMERA
SHUTTER AND DIAPHRAGM ACTUATOR
Filed March 6, 1951
2 Sheets-Sheet 1
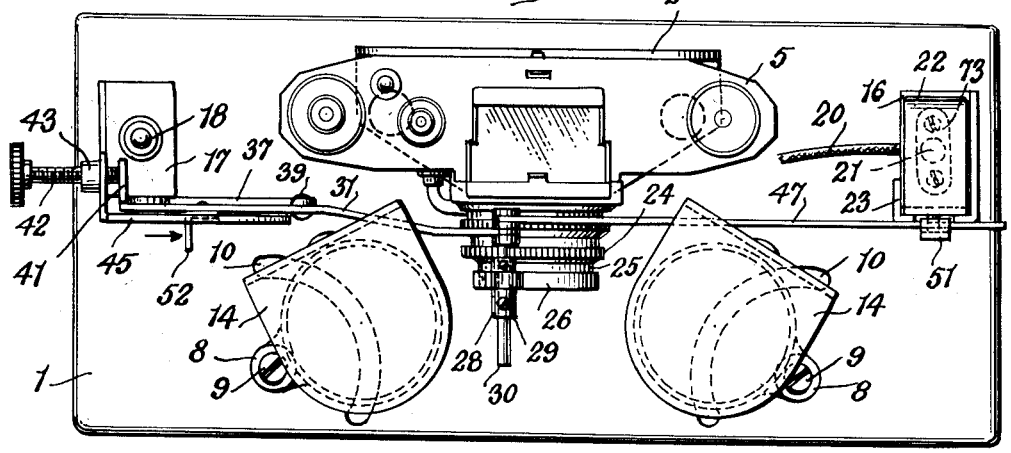
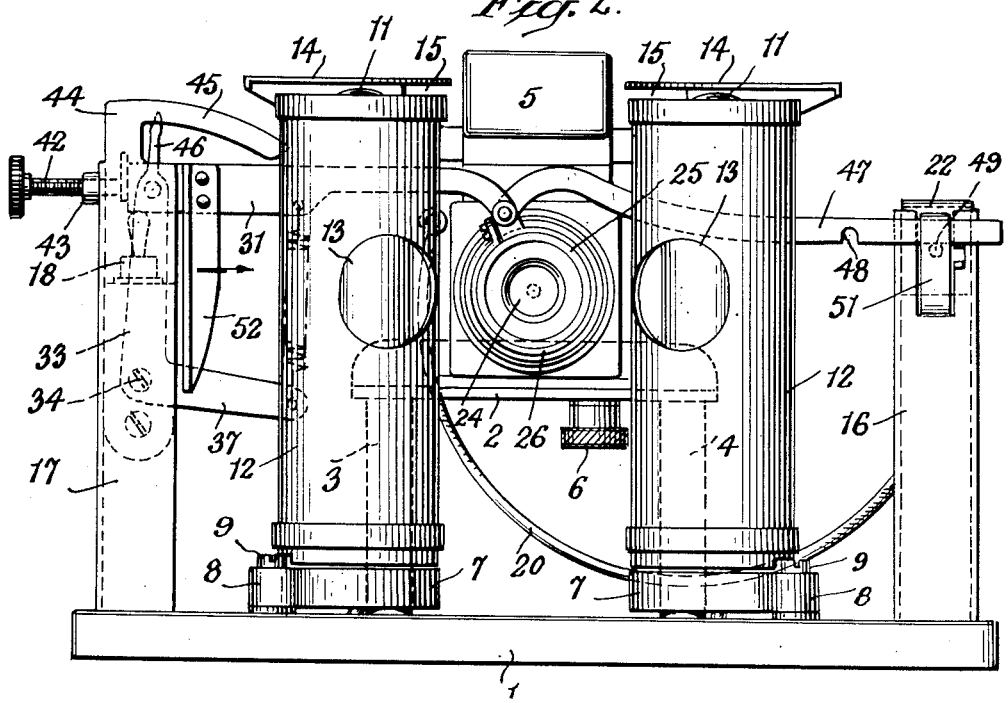
INVENTOR.
Henry W. Walden
BY
Harry Radzinsky
ATTORNEY

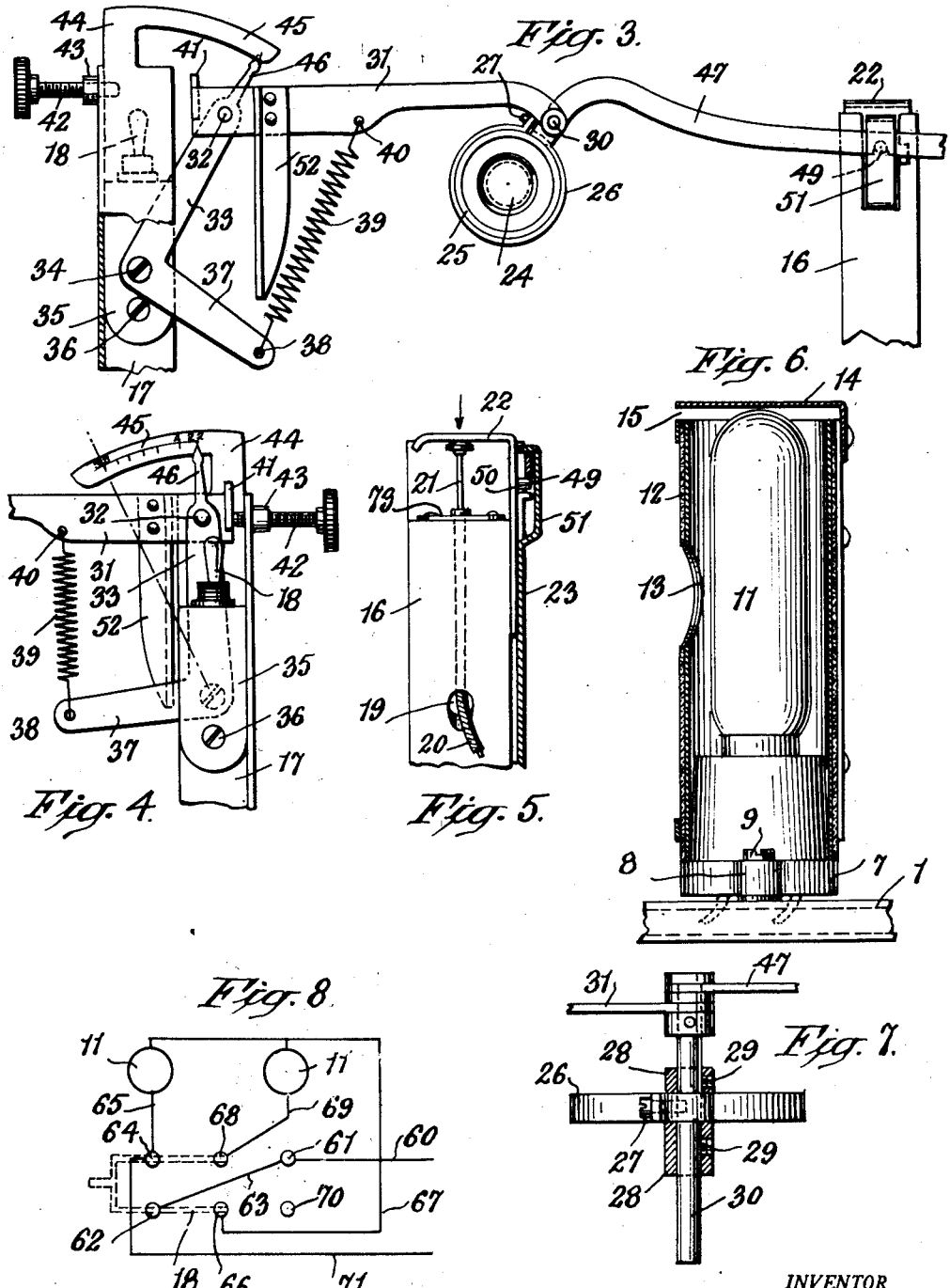

Patented Mar. 2, 1954

2,670,666

UNITED STATES PATENT OFFICE 2,670,666

CAMERA AND LAMP SUPPORT, INCLUDING CAMERA SHUTTER AND DIAPHRAGM ACTUATOR

Henry W. Walden, New York, N. Y., assignor to Walden Industries, Inc., New York, N. Y., a corporation of New York Application March 6, 1951, Serial No. 214,054

4 Claims. (Cl. 95—11)

1

This invention has reference to a photographic apparatus, and more particularly to a unit adapted for use in photographically recording industrial or clinical work, such as, for recording therapeutic progress, evaluating results of surgical and other corrective procedures, recording the progress of industrial operations or alterations, and otherwise producing photographic records usable for a host of purposes.

An object of the invention is to provide a device of this character, consisting of a supporting base carrying a camera, illuminating means and control means therefor as well as controlling devices for the operation of the camera, resulting in a complete and unitary structure which can be either hand-held or tripod-supported, and which will permit of the most satisfactory results in the photography of various subjects.

Another object of the invention is to provide a simplified control means for the camera shutter; control means for the illuminating means as well as for the focusing of the camera, with all of the elements of the above means mounted on a single base structure so that simplicity of construction and ease of use is promoted.

A still further object of the invention is to provide in a photographic apparatus, a single or unitary base structure having a camera support and illuminating means and having handles by which the base structure and its camera and the elements carried by said base structure can be hand-held firmly and with the likelihood of shake or vibration during the taking of an exposure materially reduced because of the balance arrangement of the parts of the structure and the "center of gravity" position of the supporting handles therefor.

Still another object of the invention is to provide a diaphragm-controlling device operated by control means situated remotely from the camera and in close relationship to the handles and by which the diaphragm can be set to fully opened position for focusing and then by the single pressure of a control member, set to a predetermined smaller diaphragm aperture closely followed by tripping of the camera shutter. I achieve the above diaphragm-controlling results in a structure mounted on and carried by the base member rather than by the camera so that the user may attach any one of a number of cameras on the camera support and readily couple up the diaphragm-adjusting lens ring to the diaphragm-control and thereby secure the results above described.

These and other objects are attained by the

2 invention, a more particular description of which will hereinafter appear and be set forth in the claims appended hereto.

In the accompanying drawing, wherein an illustrative embodiment of the invention is disclosed:

Fig. 1 is a top plan view of a photographic apparatus constructed according to the invention;

Fig. 2 is a front elevational view of the same;

Fig. 3 is a front elevational view of the diaphragm control mechanism;

Fig. 4 is a view looking at the rear of the setting mechanism of the diaphragm control means;

Fig. 5 is a view, with parts shown in section of the means which releases the diaphragm-control mechanism and the camera shutter;

Fig. 6 is a vertical sectional view through one of the lamp shields;

Fig. 7 is a top plan view, with parts in section, of the coupling ring of the diaphragm-control means, showing the manner in which the same may be adjusted to be attached to lenses of various lengths, or to lenses with which one or more extension tubes are used; and Fig. 8 shows the electrical wiring diagram for the control of the illuminating means.

Referring to the drawings, 1 indicates the base of the device, the same being preferably composed of metal and being hollow to accommodate the electric wiring for the lamps, such wiring being shown in diagram form in Fig. 8. Mounted upon the base, and elevated above the same, is the camera support which is in the form of an angle bracket 2, supported at the top of a pair of spaced posts 3 and 4 rising from the base. The camera 5 is fixedly, but preferably removably, attached to the support or bracket 2, by means of a tripod screw 6 or other fastening element. In the form shown, the camera is of the single-lens reflex type, but other types may be successfully used in connection with the device.

Pivotally and eccentrically mounted on the base 1 are the two lamp sockets 7, each socket being formed with a projecting ear or lug 8 through which a pivot pin 9 extends, said pin serving to pivotally attach the socket to the base, yet permitting an adjustable swinging movement of the socket, within the limits of an arcuate slot 10 provided in the base. Said curved slots 10 permit movement of the wires connected to the sockets when the sockets are moved to position them at various relative locations for proper illumination during the photographic work.

Each of the sockets 7 receives a lamp 11, and fitted over the sockets and extending around the lamp is a tubular shield 12 which may be composed in whole or in part of asbestos or other heat-resistant material. Each of the shields 12 is provided in its wall with a hole or aperture 13 through which the light rays emerge. At the top, the shield 12 is provided with a closure plate 14, so located to provide a space 15 between it and the top of the shield 12 for ventilating purposes.

The arrangement of the lamp sockets 7 and the lamps 11 fitted therein is such that by swinging or pivotal movement of the sockets on the base 1 to position the sockets at such locations as required to direct the light from the openings 13, the light can be concentrated on an object or spread over an area as needed. This result is attained without requiring rotative movement of the lamps in their sockets and thus the best positioning of the lamps to secure maximum lighting results because of proper filament position is always attained.

The apparatus is adapted to be either hand-held or supported on a tripod when used, and to facilitate the holding of the device in the hands while taking a picture, a pair of handle members, indicated respectively at 16 and 17 is employed. The handle members are alike in shape and size and are in the form of a pair of rigid posts or uprights fixedly attached to and extending upwardly from the base member 1 at opposite sides of the camera support. The post or handle member 17 carries a switch 18 by means of which control of the lamps 11 is had, and said post also acts as a mounting for parts of the diaphragm-control device to be later described.

The second post or handle member 16 is provided with a vertical passage 19 through which the cable release 20 of conventional construction extending from the camera extends to terminate in the usual plunger 21 secured by plate 73 at the upper end of the post 16. It will be obvious that by pressure imposed on the plunger 21, the shutter of the camera 5 will be operated to make an exposure. The plunger is depressed by means of a finger-piece 22 which has a plate portion 50 slidable between the front of the post or handle member 16 and a plate 23 extending partly around the post 16.

The camera is provided with the conventional lens 24, the diaphragm of which is adjusted in the usual manner, namely by rotative movement of the forward ring portion 25 of the lens barrel. The means for controlling the diaphragm apertures for focusing and photographing will now be described.

One of the disadvantages found in single-lens reflex cameras is the fact that while it is almost always desirable to take the photograph with the diaphragm stopped down to a small or medium-sized aperture, the focusing of the camera at such aperture is not often practicable due to the failure of the diaphragm when stopped down to admit sufficient light for clear focusing. Hence, most users of this type of camera find it necessary to focus while the diaphragm is wide open, for example, at f3.5, and then when focusing has been done, stop down the diaphragm to a smaller aperture, such as, possibly f8 or f16. This necessity for changing the diaphragm opening from focusing to photographic aperture interrupts the continuity of the picture-taking and very often results in loss of true focus or in a change of position or posture by the subject. It is, therefore, desirable that a means be provided which will enable the focusing of the picture and the taking thereof to be a single and continuous operation. This result is attained by the structure to be now described.

At 26 is shown a contractible ring or collar adapted to be fitted clampingly around the diaphragm-operating member or lens-ring 25 of the lens, so that by rotative movement of the ring 26, the diaphragm opening may be regulated. Said ring or collar 26 is split and is tightened around the lens member 25 by means of the set screw 27. The ring 26 is attached to a sleeve 28 which is adjustable along the length of a rod 30, said sleeve being fastened at any selected position along the rod 30 by means of the set screws 29. Pivotally secured to the rod 30 is one end of a bar 31, which has its opposite end pivoted at 32 to one arm 33 of a bell-crank lever pivoted at 34 to a plate 35 fixedly secured by screws to the post 17, one of said screws being shown at 36. The second arm 37 of the bell-crank lever is attached at 38 to one end of a coil spring 39 which has its opposite end attached at 40 to the bar 31. At its second end, the bar 31 is formed with a lug 41 adapted to abut against an adjusting pin 42 threadable through a boss 43 on a plate 44 secured to and rising above the post 17 as clearly seen in Figs. 3 and 4. Said plate is formed at the top with a quadrant 45, which may be calibrated with diaphragm stop openings as clearly seen in Fig. 4, and the upper end of the arm 33 of the bell-crank is provided with a hand or pointer 46 moving over the quadrant and adapted to indicate a selected stop opening in a manner to be presently described.

Pivotally attached at one end to the rod 30 is a bar 47 which is provided in its lower edge near its free end, with a notch 48 (Fig. 2) intended for engagement with a pin 49 extending forwardly from a downwardly-extending part 50 of the finger-piece 22. The bar 47 is guided by an outwardly-bent portion 51 on the plate 23. The bars 31 and 47, coupled to the collar 26, thus form a linkage by which the collar is rotated either clockwise or counterclockwise as required.

In Figs. 1 and 2 of the drawings, the diaphragm control device just described is shown in its inoperative or released position. At this time, it will be noted that the spring 39 is holding the lug 41 in abutment with the end of the adjusting screw 42, and the extent to which the spring 39 urges the bars 31 and 47 to the left is determined by the position of the end of the screw 42. Thus, by rotating the screw 42 to the required extent, the extent to which the collar or ring 26 and the diaphragm-adjusting ring 25 on the lens is rotated, is determined. That is to say, in the operation of the device the photographer rotates the screw 42 until the hand or pointer indicates on the graduations of the quadrant 45 the stop opening at which he desires to take the photograph and this will govern the extent to which the bars 31 and 47 are moved to the left, and the collar 26 rotated in a counter-clockwise direction.

The diaphragm control is set in open or cocked position by engaging the projecting finger-piece 52, which extends downwardly from the bar 31, and moving it to the right until the notch 48 clicks into engagement with the pin 49. The spring-pressed plunger 21 of the cable-release exerts a springy upward pressure on the finger-piece 22 and thus the pin 49 will be held in engagement with the notch 48 as long as the plunger 21 is in its normal or underpressed position, as shown in Fig. 5. When the device is set in open position, or as shown in Fig. 3, and is so held in such position by the engagement of the notch 48 with the pin 49, the movement of the bars 31 and 47 has caused a clockwise rotation of the collar 26 which has rotated the lens ring 25 to the extent necessary to open the diaphragm to its largest aperture. This permits focusing of the lens with the diaphragm wide open and permits the maximum light to pass through the lens and facilitate the focusing operation. As soon as proper focus is obtained, the exposure is then made by pressure imposed on the finger-piece 22, and as the same is forced downwardly it will first move the pin 49 out of the notch 48 so that the spring 39 will then move the linkage 31, 47 toward the left until the lug 41 abuts against the end of the adjusting screw 42. This movement causes a counter-clockwise rotation of the collar 26 and lens ring 25 engaged thereby, to the extent determined by the setting of the screw 42 and at the selected diaphragm opening for the taking of the photograph. As a continued pressure is exerted on the finger-piece 22, the plunger 21 will be depressed to the extent required for the operation of the camera shutter to make the exposure. It will, of course, be understood that the operation of the diaphragm-control and the shutter is a continuous one requiring merely a single downward depression on the finger-piece 22 with the diaphragm-control being first moved to its closed position and then the shutter operated.

To compensate for the length of various lenses which might be employed, or in the case of one or more extension tubes interposed between the lens and the body of the camera, the rod 30 is made of a length which permits the sleeve 28 to be positioned at any position thereon which might be required to enable the collar 26 to fit on the diaphragm-controlling ring of the lens.

The electrical circuit for the illuminating means, consisting of the lamps 11 is shown in Fig. 8 wherein it will be seen that the switch 18 is a six-point double-throw, double-pole type. One of the leads, indicated at 60, from the current supply or from a conventional outlet receptacle is connected to the end contact 61 which is connected by the wire or lead 63 to an opposite end contact 62. The second lead from the power supply is that shown at 71 and the same connects to the switch contact shown at 64. The said contact 64 connected by wire 65 to the socket of one of the lamps 11. The center contact 66 of the switch connects by wire 67 to the two sockets as shown, while the second center contact shown at 68 connects by wire 69 to the second lamp socket. One end contact, or that shown at 70, remains open.

This arrangement is such that a dimming effect of the lamps is obtained when the switch is thrown in one direction and full illumination of the lamps is secured when the switch is thrown in the opposite direction. This enables the photographer to focus the camera while the lamps are in a dimmed condition and then, by throwing the switch in the opposite direction, to brilliantly illuminate the object and take the photograph.

From the foregoing, the operation of the apparatus will be readily understood. When preparing to take a picture, the adjusting screw 42 is set at the required position to designate the diaphragm stop opening at which the photograph is to be taken. The shutter is adjusted for the required speed, and by pressure against the finger-piece 52, the diaphragm-control is moved to open or cocked position, at which time the notch 48 will engage with the pin 49 and hold the control in a position to maintain the diaphragm wide open, thus affording the most illumination for the object on the mirror and focusing glass of the camera. The switch 18 is then thrown to dimming position, causing the lamp to afford sufficient illumination for focusing without causing discomfort to the subject being photographed. When focus is obtained, the switch is then thrown to brilliant illumination and the finger-piece 22 is depressed to cause the diaphragm to be closed to the selected stop opening and then the shutter operated to make the exposure.

While the apparatus is being operated in the manner above described, it is conveniently hand-held by gripping the posts or handle members 16 and 17, with the fingers conveniently positioned at the top of these members and free to operate the switch and finger-piece 22 respectively. The apparatus can be held steadily and even for relatively long exposures without jarring. The base member 1 may be provided with a tripod thread for mounting of the apparatus upon a tripod or other suitable support.

While I have herein shown a single embodiment of the invention, it is apparent that various modifications may be made therein without departing from the spirit of the invention. For example, the illuminating means may be other than that shown, such as, for example, stroboscopic lamps; the power source may, for portability, be batteries or a so-called power pack, and various other changes made as will be apparent to those skilled in this art.

In the design of the herein-described structure, an effort has been made to attain a balanced effect facilitating the handling of the device and avoiding shake or tremor during the making of an exposure. This result is attained by primarily locating the handles or posts 16 and 17 in such relation to the other parts of the apparatus that such handles are located at the center of gravity of the structure and thus tilt or wobble of the device is avoided when handling the device.

What I claim is:

1. In a photographic apparatus, a base, a camera support thereon, a pair of spaced posts between which the camera support is located, said posts constituting handles for manually supporting the base, lighting means mounted on the base and consisting of lamps located forwardly of the posts and camera support, a diaphragm control means including a collar engaging the diaphragm-operating ring of a camera resting on the support, a link pivoted to said collar, a lever pivoted on one of the posts, one end of the link being connected to said lever, spring means tending to draw the link in a direction toward said post, means for limiting the extent of movement of the link toward the post and thus controlling the extent of rotation of the collar, a second link pivotally attached to the collar, a finger-piece movable on the second post, means on the second link for engagement with the finger-piece to thereby hold both links against shifting movement and to also hold the collar against rotative movement until depression of the finger-piece, means on the first post for causing illumination of the lighting means and means operated by the finger-piece for causing operation of the shutter of a camera mounted on the camera support.

2. In a photographic apparatus, a base, a camera support thereon, a pair of spaced, upstanding posts on the base constituting supporting handles therefor, lights mounted on the base, a switch control for said lights mounted on one of the posts, a shutter release of the spring-pressed plunger type mounted on the second post, a finger-piece movably mounted on the second post and held in an elevated position by the spring-pressed plunger of the shutter release, a diaphragm control device including a collar fitted on the diaphragm-operating ring of a camera mounted on the support, a link extending from said collar to the second post, means on said link for detachably engaging the finger-piece, which means causes engagement between the link and finger-piece while the finger-piece is held in an elevated position by the shutter release plunger, a second link extending from the collar on the first post, linkage connecting the last-mentioned link to said first post, and spring means for moving both links and rotating the collar when the finger-piece is depressed.

3. A photographic apparatus comprising, a base, a pair of spaced upright posts arising from the base, a camera support on the base between the posts, a pair of lamp sockets on the base at positions forwardly of the posts and camera support, a diaphragm-control device including a collar fitted on the diaphragm-operating ring of a camera mounted on the support, a link having one end pivotally attached to the collar, said link extending toward the first of the posts, a bell-crank lever pivoted on said post and having one of its arms pivotally connected to said link, the second arm of the lever being connected to one end of a spring, the second end of the spring being connected to the link, a second link having one end connected to the collar, said second link extending toward the second post, the second link being notched, a finger-piece slidably mounted on the second post and normally engaging the notched portion of the second link, a shutter release mounted on the second post and actuated by the finger-piece after the same has become disengaged from the notch in the second link upon manual depression of the finger-piece, and a light-control switch mounted on the first post.

4. A photographic apparatus comprising, a base, a pair of spaced upright posts arising from the base and constituting handles by which the base is manually supported, a camera support mounted on the base between the posts, a collar fitted on the diaphragm-operating ring of a camera mounted on the support lighting means on the base in advance of the collar, a link pivoted at one end to said collar, a finger-piece on one of the posts, means on the link for engagement with said finger-piece in a manner to hold the link against longitudinal movement and to prevent rotative movement of the collar while said link is in engagement with the finger-piece, a shutter control means operated by the finger-piece on manual depression of the finger-piece and release of the link, a second link pivoted at one end to the collar, means on the second post pivotally engaging an end of said second link, said means being pivotal on the post, an indicator on said means, a stop for said means to limit the swing of said means and to limit the longitudinal movement of the link attached thereto, spring means for urging the last-mentioned link in a direction toward the stop means upon depression of the finger-piece, and light-control means mounted upon the second post.

HENRY W. WALDEN.

References Cited in the file of this patent

UNITED STATES PATENTS

| Number | Name | Date |
|---|---|---|
| 1,791,112 | Azarraga | Feb. 3, 1931 |
| 2,213,749 | Strauss | Sept. 3, 1940 |
| 2,239,379 | Bucky | Apr. 22, 1941 |
| 2,262,509 | McNabb | Nov. 11, 1941 |
| 2,322,032 | Kunze | June 15, 1943 |
| 2,581,300 | Rossman et al. | Jan. 1, 1952 |

FOREIGN PATENTS

| Number | Country | Date |
|---|---|---|
| 409,777 | Great Britain | May 10, 1934 |